United States Patent [19]
Burke

[11] 3,771,801
[45] Nov. 13, 1973

[54] SEALING DEVICE
[75] Inventor: John A. Burke, Rocky River, Ohio
[73] Assignee: Greene, Tweed & Co., Inc., North Wales, Pa.
[22] Filed: June 5, 1972
[21] Appl. No.: 259,640

[52] U.S. Cl. .................................. 277/188, 277/165
[51] Int. Cl. .............................................. F16j 15/24
[58] Field of Search ..................... 277/188, 189, 165

[56] References Cited
UNITED STATES PATENTS
3,473,814 10/1969 Bastow .................................. 277/188
3,614,114 10/1971 Traub ................................... 277/188
3,630,485 12/1971 Williams .............................. 277/188
2,765,204 10/1956 Josephson ............................ 277/188

Primary Examiner—George E. Lowrance
Assistant Examiner—Robert L. Smith
Attorney—Arthur H. Seidel et al.

[57] ABSTRACT

A double acting sealing assembly including a modified T-shaped sealing ring and mating substantially trapezoidal shaped back-up rings or anti-extrusion rings are provided. An annular void is provided at the static surface of the sealing ring. The sealing surface of the ring is formed by converging end faces which meet at a sharp sealing edge. In an alternative embodiment, the void may be filled with a material different from that of the sealing ring.

8 Claims, 5 Drawing Figures

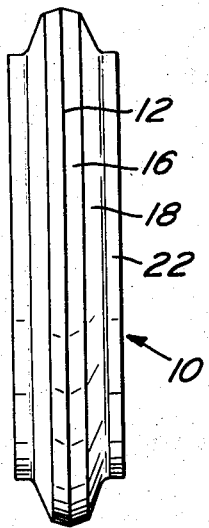
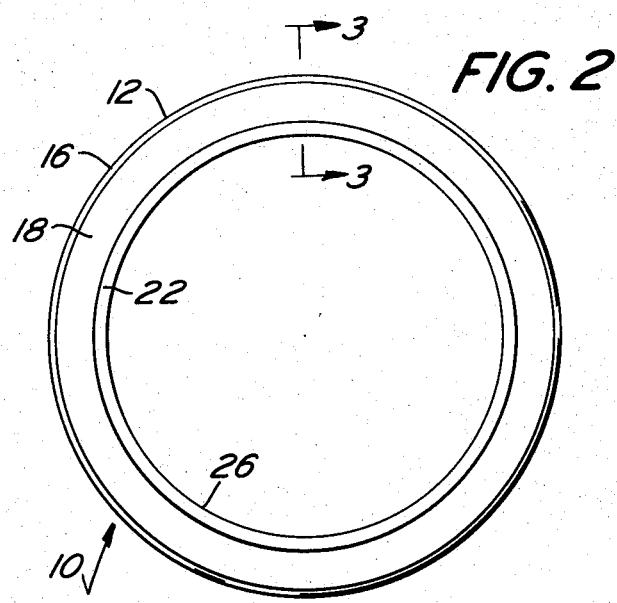
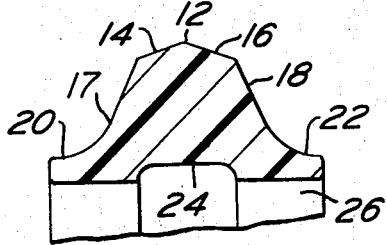
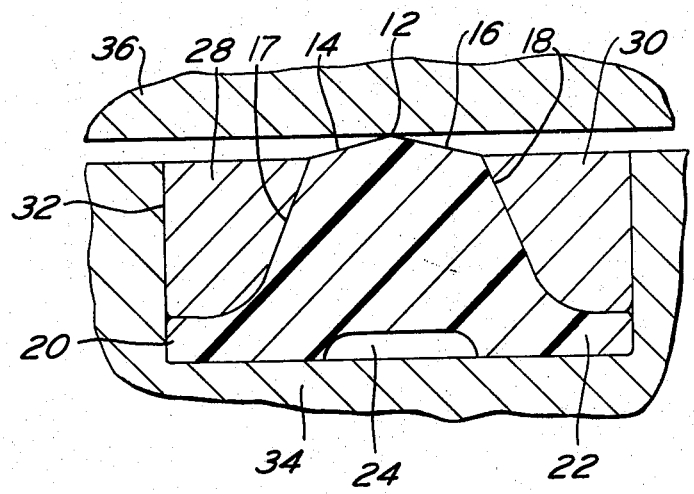
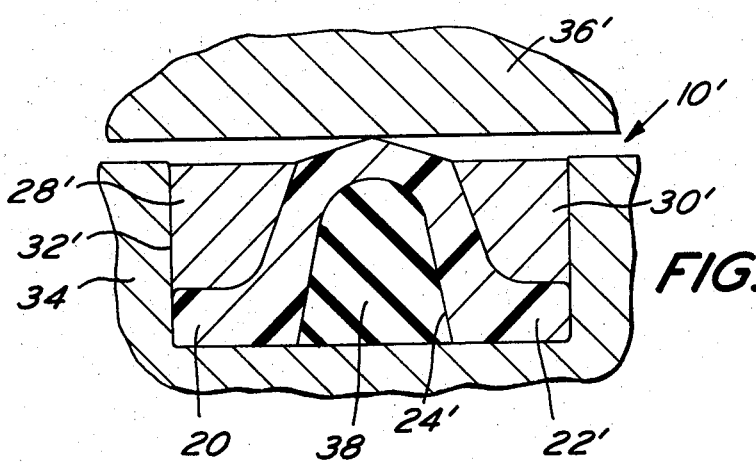

SEALING DEVICE

This invention is directed to a double acting sealing device which is particularly designed for use in hydraulic or pneumatic systems such as linear actuators or the brake cylinder for an aircraft wheel system. The sealing ring of the present invention has a sealing edge designed in a manner so that the sealing assembly results in a dry rod or bore condition while being less susceptible to compression-set behavior. A seal is attained due to the structural relationship of the sealing device with minimal squeeze while the device is resistant to surface tearing under very high pressures and extrusion gap conditions.

The sealing ring is generally T-shaped in section with axially directed legs at the static face. The side faces of the ring converge upwardly from the legs. Sealing rings of this nature are known as per U.S. Pats. Nos. 3,614,114 and 2,765,204. The sealing ring of this invention constricts the upwardly converging side faces so that they terminate in converging end faces meeting at a sharp dynamic sealing edge.

The sealing ring is provided with complementary back-up or anti-extrusion rings which are generally trapezoidal in section. The design objective of the invention is to have converging side faces to effect a gain in the outward thrust of the back-up or anti-extrusion rings by a vector force such as a wedge. Further, the trapezoidal shape of the back-up or anti-extrusion rings tends to "key" the parts together lessening the chance of misassembly or misalignment under shock and spike pressurizations. All inside corners of the ring except for the sharp lip are rounded or filleted to eliminate abrupt changes in cross section that could result in stress-risers or potential overstress failure.

It is an object of the present invention to provide a novel compression sealing device.

It is another object of the present invention to provide a sealing device which is efficient, long-lasting, and less susceptible to compression-set deficiency.

It is another object of the present invention to provide a sealing device which will effect a seal with minimum squeeze while being resistant to surface tearing or abrading under very high pressure and extrusion gap conditions.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is an end elevation view of the sealing ring.

FIG. 2 is a side elevation view of the sealing ring shown in FIG. 1.

FIG. 3 is a sectional view of the sealing ring on a large scale taken along the line 3—3 in FIG. 2.

FIG. 4 is a sectional view showing the sealing ring mounted in its gland with its trapezoidal back-up or anti-extrusion rings to effect a seal while being illustrated on an enlarged scale.

FIG. 5 is a sectional view similar to FIG. 4, but illustrating another embodiment of the present invention.

Referring to the drawing in detail, wherein like numerals indicate like elements, there is shown in FIGS. 1 and 2 a sealing ring in accordance with the present invention designated generally as 10. The sealing ring is annular and is provided either on its outer or inner peripheral surface with a sharp sealing edge 12. When the sealing ring is to be mounted in a groove of a bore and is intended to effect a seal with a rod extending through the bore, the sealing edge would be on the inner periphery of the ring. When the sealing ring is to be mounted on a moving rod or piston and adapted to effect a seal with the bore, the edge 12 is on the outer periphery of the ring.

The ring 10 is generally T-shaped in section. The sealing edge 12 is defined by the intersection of flat converging end faces 14 and 16 disposed at an angle of about 16° to 22° with respect to the axis of the ring 10. The ring 10 includes converging side faces 17 and 18 which extend to the end faces 14 and 17 from axially extending legs 20 and 22.

For purposes of illustration, the ring 10 has its sealing edge 12 on its outer peripheral surface. The legs 20 and 22 define the width of the ring and also define the inner peripheral surface 26. Centrally disposed on the inner peripheral surface 26, opposite the sealing edge 12, there is provided a void 24. Void 24 is attained by providing a groove in the surface 26. Depending upon the function of the ring 10 as described above, the void 24 is on the inner or peripheral surface of the ring but always opposite the lip 12.

The ring 10 is provided with back-up or anti-extrusion rings 28 and 30 which are complementary to the side faces 17 and 18 and the legs 20 and 22. See FIG. 4. The height of the rings 28 and 30 corresponds approximately to the height of the converging walls 17 and 18.

As illustrated in FIG. 4, the sealing device is mounted in a groove 32 on the first member 34. The sealing edge 12 contacts the second member 36 whereby a seal is effected between members 34 and 36. Either one of members 34, 36 may be a movable member. Under static conditions the rings 28 and 30 do not form a seal with either of members 34 and 36. Under pressurized conditions, the void 24 provides a gap into which the ring 10 may deform, allowing edge 12 to remain defined rather than being flattened under compressive forces resulting in a wiping action on the surface of member 36, thereby effecting a more perfect dynamic sealing function.

The ring 10 may be made from a wide variety of polymeric plastic materials such as nitrile rubber, carboxylated nitrile rubber, a fluorinated elastomer such as Viton (Trademark), etc. The anti-extrusion rings 28 and 30 are preferably low friction members made from a bearing material such as wear resistant nylon, Teflon (Trademark), or mixtures thereof.

In FIG. 5, there is illustrated another embodiment of the present invention designated generally as 10'. In FIG. 5, the corresponding elements are provided with corresponding primed numerals. The device in FIG. 5 is the same as the device described above except as will be made clear hereinafter.

In FIG. 5, the ring is provided with a void 24' which is substantially greater than the void 24. Thus, as shown more clearly in FIG. 4, the void 24 had a depth equivalent to about two-thirds the thickness of the legs 20 and 22. In FIG. 5, the depth of the void 24' is approximately 80 percent of the radial thickness of the ring.

The void 24' is filled with a core 38. The core 38 is an elastomeric material different from the material of the sealing ring and has properties whereby it is substantially more flexible and easier to deform, retaining its elasticity at greater temperature variables. Suitable materials for the core 38 include silicone rubber, fluorosilicone rubber, etc., when using the materials described above for the sealing ring. A wide variety of other soft and/or easily deformable polymeric plastic materials may be utilized for the core 38.

In the embodiment shown in FIG. 5, the sealing ring is preferably an elastomer selected so as to attain the greatest compliance and adaptability to specific environmental conditions while performing its function to seal the dynamic surface and energize the back-up or anti-extrusion rings. The core 38 is separately molded of a different elastomeric material selected to provide the desirable properties whereby it will provide optimum resilience to maintain constant contact between the ring and groove under all service conditions while providing the static sealing function.

Generally T-shaped sealing rings have been proposed heretofore. In the present invention, it is particularly significant that the ring has a sharp sealing edge 12 defined by converging end faces 14 and 17 with the converging side faces 16 and 18 extending from the axially disposed legs 20 and 22. As a result of the structural interrelationship, a wedging action under dynamic conditions can be attained so that a suitable seal under high pressure and extrusion gap conditions may be attained with long life for the entire sealing device. I have found that a sharp sealing edge performs better than a flat or rounded sealing edge which tend to be nibbed away thereby inducing seal failure.

The present invention may be embodied in other specific forms without departing from the spirit or essential attributes thereof and, accordingly, reference should be made to the appended claims, rather than to the foregoing specification as indicating the scope of the invention.

I claim:

1. A sealing device comprising an annular T-shaped cross-section sealing ring of elastomeric material, said ring having axially extending legs and convering side faces merging into converging end faces, said end faces meeting to define a sharp sealing edge, a complementary mating anti-extrusion ring juxtaposed to each side face and the adjacent leg, said anti-extrusion rings being generally trapezoidal in section and have a radial dimension corresponding generally to but not substantially greater than the height of said converging side faces, and said sealing ring having a void on the peripheral surface opposite said sealing edge.

2. A sealing device in accordance with claim 1 wherein said void is shallower than the thickness of said legs.

3. A sealing device in accordance with claim 1 wherein said void is deeper than the thickness of said legs.

4. A sealing device in accordance with claim 3 including a core in said void, said core being made from a material which is of a different hardness than the material of said sealing ring.

5. A sealing device in accordance with claim 1 wherein said sealing ring is a nitrile rubber, and said anti-extrusion rings being made from a material which is self-lubricating.

6. Apparatus comprising a sealing device for sealing the annular clearance between opposed surfaces on first and second interfitting members, said first member having an annular groove receiving said sealing device, said second member having a cylindrical surface opposed to said groove, said sealing device including an annular T-shaped cross-section sealing ring of elastomeric material, said ring having axially extending legs and converging side faces merging into converging end faces, said end faces meeting to define a centrally disposed sharp sealing edge in contact with said cylindrical surface, a complementary mating anti-extrusion ring juxtaposed to each side face and the adjacent leg, and said sealing ring having a void on the peripheral surface thereof which is juxtaposed to the groove and opposite the peripheral surface containing said sealing edge.

7. Apparatus in accordance with claim 6 wherein each anti-extrusion ring has a height corresponding to the distance between said legs and the intersection of a side face with the end face so as to be spaced from said second member under static conditions.

8. Apparatus in accordance with claim 6 wherein each anti-extrusion ring is in sealing contact with a side face of said sealing ring and a side wall of said groove.

* * * * *